United States Patent
Park et al.

(10) Patent No.: US 11,252,784 B2
(45) Date of Patent: Feb. 15, 2022

(54) ELECTRONIC DEVICE FOR SCHEDULING WIRELESS NETWORK SERVICE ACCORDING TO APPLICATION AND METHOD OF OPERATING SAME

(71) Applicant: Samsung Electronics Co., Ltd., Suwon-si (KR)

(72) Inventors: Cholseo Park, Suwon-si (KR); Raegyoung Noh, Suwon-si (KR); Kyungtak Hur, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 23 days.

(21) Appl. No.: 16/691,116

(22) Filed: Nov. 21, 2019

(65) Prior Publication Data

US 2020/0163154 A1 May 21, 2020

(30) Foreign Application Priority Data

Nov. 21, 2018 (KR) .................. 10-2018-0144884

(51) Int. Cl.
*H04W 48/18* (2009.01)
*H04W 80/12* (2009.01)
(Continued)

(52) U.S. Cl.
CPC .......... *H04W 80/12* (2013.01); *H04B 7/0413* (2013.01); *H04W 8/183* (2013.01); *H04W 48/18* (2013.01)

(58) Field of Classification Search
CPC .... G06F 9/5011; H04B 7/0413; H04W 48/18; H04W 72/02; H04W 80/12; H04W 88/06; H04W 8/183
See application file for complete search history.

(56) References Cited

U.S. PATENT DOCUMENTS

2008/0056286 A1 3/2008 Forssell et al.
2008/0311912 A1 12/2008 Balasubramanian et al.
(Continued)

FOREIGN PATENT DOCUMENTS

KR 10-2009-0049082 A 5/2009
KR 10-2010-0021647 A 2/2010
(Continued)

OTHER PUBLICATIONS

International Search Report dated Mar. 4, 2020, issued in International Patent Application No. PCT/KR2019/016016.
(Continued)

*Primary Examiner* — Minh Trang T Nguyen
(74) *Attorney, Agent, or Firm* — Jefferson IP Law, LLP

(57) ABSTRACT

An electronic device is provided. The electronic device includes a communication circuit, a display, a memory, and at least one processor configured to identify a request for executing an application, based on identification information about the application, perform at least one operation of the application via a first communication network or a second communication network among the plurality of communication networks, in response to no communication network allocated to the application being identified based on the identification information about the application, perform at least one first operation of the application via the first communication network designated for the electronic device, and in response to at least one communication network allocated to the application being identified based on the identification information about the application, perform at least one second operation of the application via the second communication network allocated to the application among the plurality of communication networks.

22 Claims, 10 Drawing Sheets

(51) Int. Cl.
*H04B 7/0413* (2017.01)
*H04W 8/18* (2009.01)

(56) References Cited

U.S. PATENT DOCUMENTS

| | | |
|---|---|---|
| 2009/0286531 A1 | 11/2009 | Bhatt et al. |
| 2011/0081951 A1 | 4/2011 | Hwang |
| 2011/0223866 A1 | 9/2011 | Cho |
| 2012/0135715 A1 | 5/2012 | Kang et al. |
| 2014/0351047 A1* | 11/2014 | Li .................. G06Q 30/0255 705/14.53 |
| 2015/0027689 A1 | 1/2015 | Stokes et al. |
| 2015/0207689 A1* | 7/2015 | Matsumoto ............. H04L 41/12 709/223 |
| 2016/0234212 A1* | 8/2016 | Huang ................. H04L 63/104 |
| 2017/0094025 A1 | 3/2017 | Gupta |
| 2017/0164277 A1 | 6/2017 | Anyuru |
| 2018/0234866 A1 | 8/2018 | Johnsson et al. |

FOREIGN PATENT DOCUMENTS

| | | |
|---|---|---|
| KR | 10-2011-0008245 A | 1/2011 |
| KR | 10-2015-0022971 A | 3/2015 |
| WO | 2011/022506 A1 | 2/2011 |
| WO | 2018/063949 A1 | 4/2018 |

OTHER PUBLICATIONS

Extended European Search Report dated Apr. 6, 2020, issued in European Patent Application No. 19210778.7.
European Office Action dated Sep. 27, 2021, issued in European Patent Application No. 19 210 778.7.

* cited by examiner

ELECTRONIC DEVICE FOR SCHEDULING WIRELESS NETWORK SERVICE ACCORDING TO APPLICATION AND METHOD OF OPERATING SAME

CROSS-REFERENCE TO RELATED APPLICATION(S)

This application is based on and claims priority under 35 U.S.C. § 119(a) of a Korean patent application number 10-2018-0144884, filed on Nov. 21, 2018, in the Korean Intellectual Property Office, the disclosure of which is incorporated by reference herein in its entirety.

BACKGROUND

1. Field

The disclosure relates to an electronic device for scheduling a wireless network service according to an application which is running and a method of operating the electronic device.

2. Description of Related Art

A subscriber identity module or subscriber identification module, widely known as a subscriber identity module (SIM) card, is a card-type module for use in portable terminals and may store personal information to provide various services, such as for subscriber authentication, billing, or security. A SIM card enables the user to enjoy mobile communications on the same phone number anywhere code division multiple access (CDMA), global system for mobile communication (GSM), or other various mobile communication services are available.

A SIM card may be shaped as a smart card configured to be inserted into a portable terminal. Also available are software SIM cards which may be saved in the storage of portable terminals.

An electronic device with a plurality of SIM cards may take advantage of different network services depending on the SIM cards. Applications executable on an electronic device are typically operated via a particular network service selected by the user or allocated to the electronic device. For example, when an application using a network service runs on an electronic device, services may be provided depending on a designated one among a plurality of networks and the user's environments (e.g., service plans, speed, or preferences).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device for scheduling a wireless network service according to an application which is running among a plurality of applications installed on the electronic device.

Another aspect of the disclosure is to provide an electronic device for performing at least one operation of an application using a wireless network service allocated to the application. According to various embodiments, an electronic device may execute one application using different network services according to the user's request.

Additional aspects will be set forth in part in the description which follows and, in part, will be apparent from the description, or may be learned by practice of the presented embodiments.

In accordance with an aspect of the disclosure, an electronic device is provided. The electronic device includes a communication circuit configured to support communication through a plurality of communication networks, a display, a memory configured to store information about a plurality of applications and information about the plurality of communication networks, and at least one processor operatively connected with the communication circuit, the display, and the memory. The at least one processor is configured to identify a request for executing an application, based on identification information about the application, perform at least one operation of the application via a first communication network or a second communication network among the plurality of communication networks, in response to no communication network allocated to the application being identified based on the identification information about the application, perform at least one first operation of the application via the first communication network designated for the electronic device among the plurality of communication networks, and in response to at least one communication network allocated to the application being identified based on the identification information about the application, perform at least one second operation of the application via the second communication network allocated to the application among the plurality of communication networks.

In accordance with another aspect of the disclosure, a method for operating an electronic device is provided. The method includes identifying a request for executing an application, and, based on identification information about the application, performing at least one operation of the application via a first communication network or a second communication network among a plurality of communication networks. The performing of the at least one operation of the application includes, in response to no communication network allocated to the application being identified based on the identification information about the application, performing at least one first operation of the application via the first communication network designated for the electronic device among the plurality of communication networks, and in response to at least one communication network allocated to the application being identified based on the identification information about the application, performing at least one second operation of the application via the second communication network allocated to the application among the plurality of communication networks.

In accordance with another aspect of the disclosure, an electronic device is provided. The electronic device includes a display, a communication circuit configured to support a plurality of communication networks, at least one processor operatively connected with the display and the communication circuit, and a memory operatively connected with the at least one processor and configured to store information about a plurality of applications and information about the plurality of communication networks. The memory is further configured to store instructions that, when executed, cause the at least one processor to control the display to display a first icon for executing a first application via a first communication network and a second icon for executing the first application via a second communication network different from the first communication network, in response to a selection of the first icon, execute the first application and control the communication circuit to transmit data by the first application via the first communication network to an external electronic device, and in response to a selection of the second icon, execute the first application and control the communication circuit to transmit the data by the first application via the second communication network to the external electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
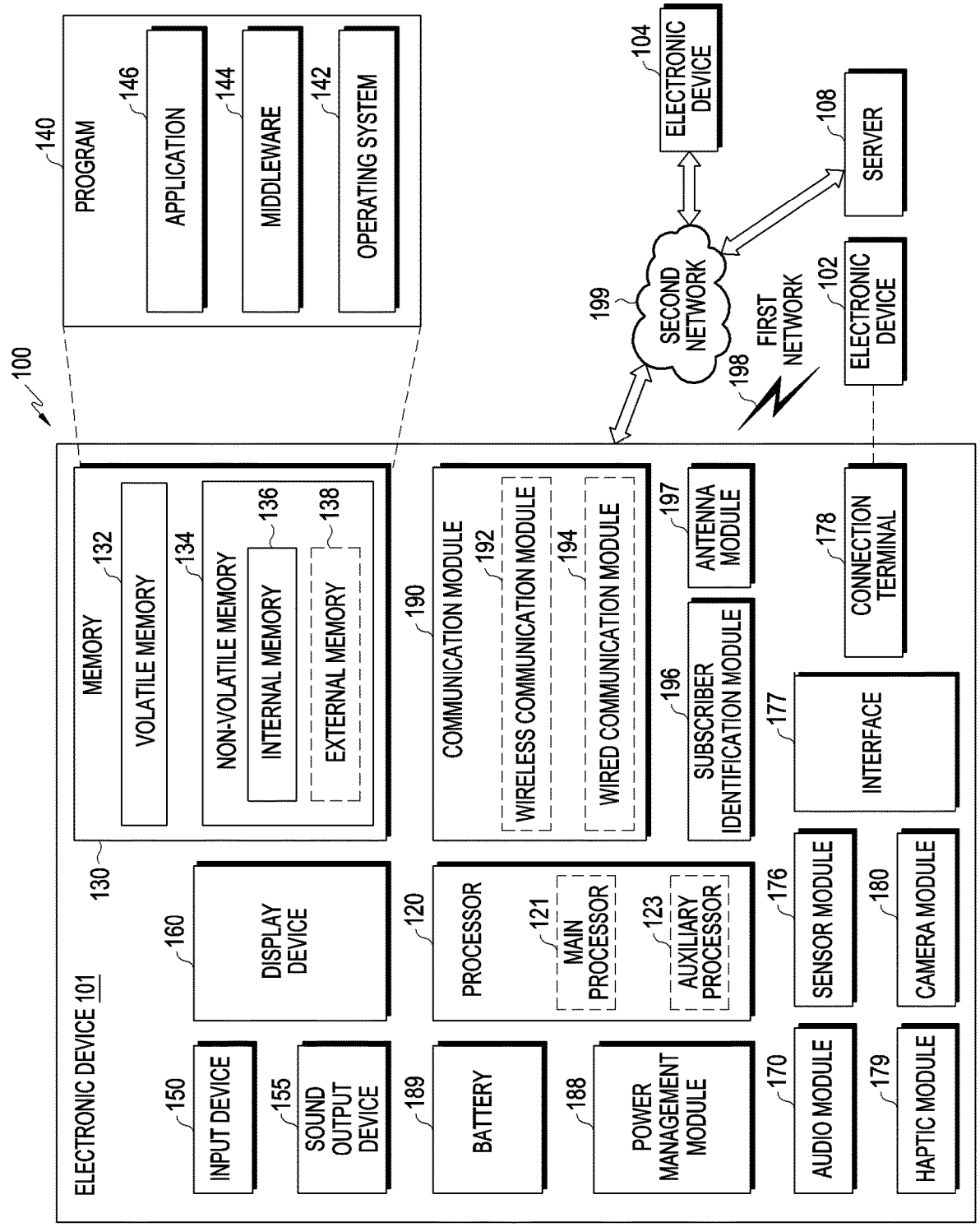
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120 and may perform various data processing or computation. According to one embodiment, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing recordings, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the external electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. The external electronic devices 102 and 104 each may be a device of the same or a different type from the electronic device 101. According to an embodiment, all or some of operations to be executed at the electronic device 101 may be executed at one or more of the external electronic devices 102 and 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
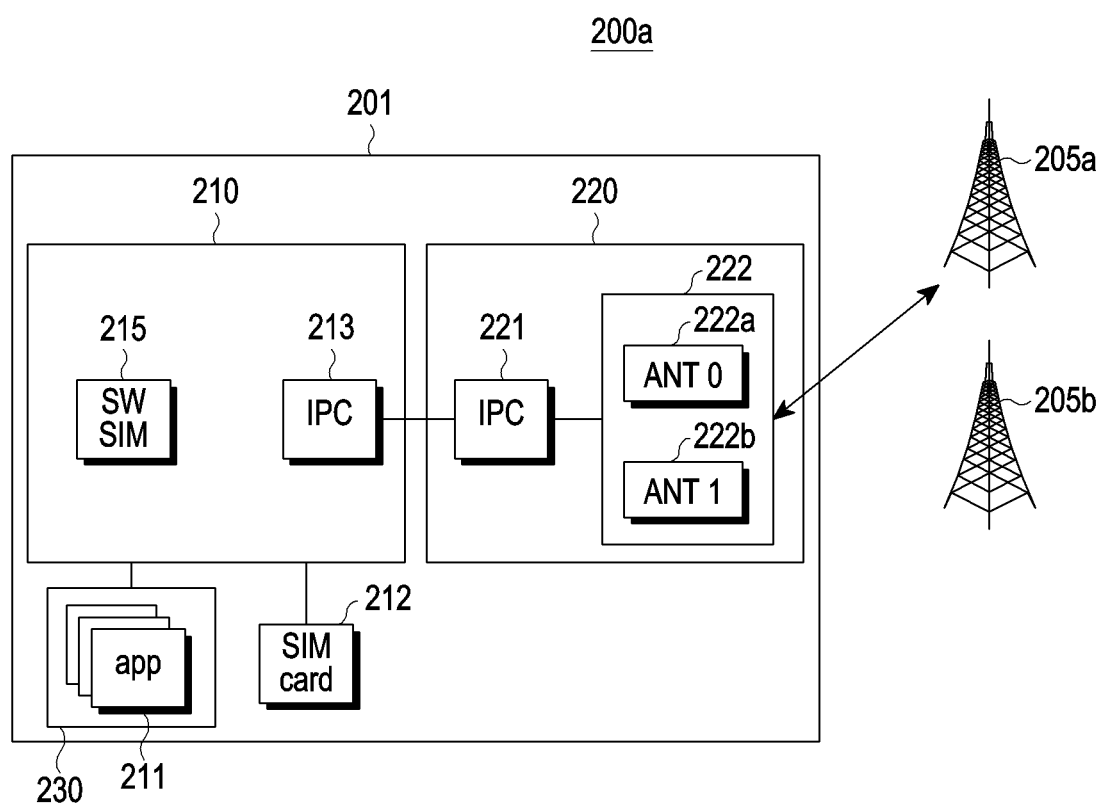
FIGS. 2A, 2B, and 2C are concept views illustrating a process in which an electronic device and at least one of a plurality of communication networks connect to each other according to various embodiments of the disclosure.
Figure 2B:
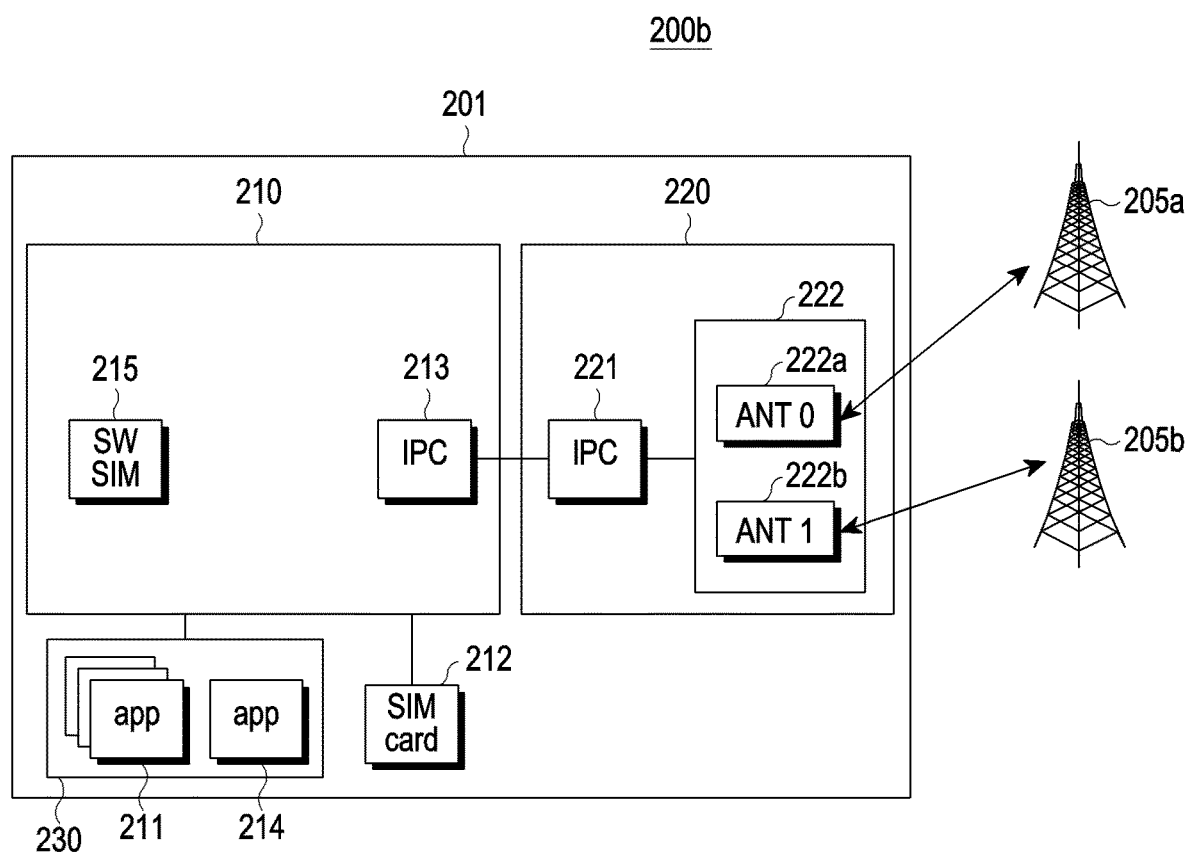
Figure 2C:
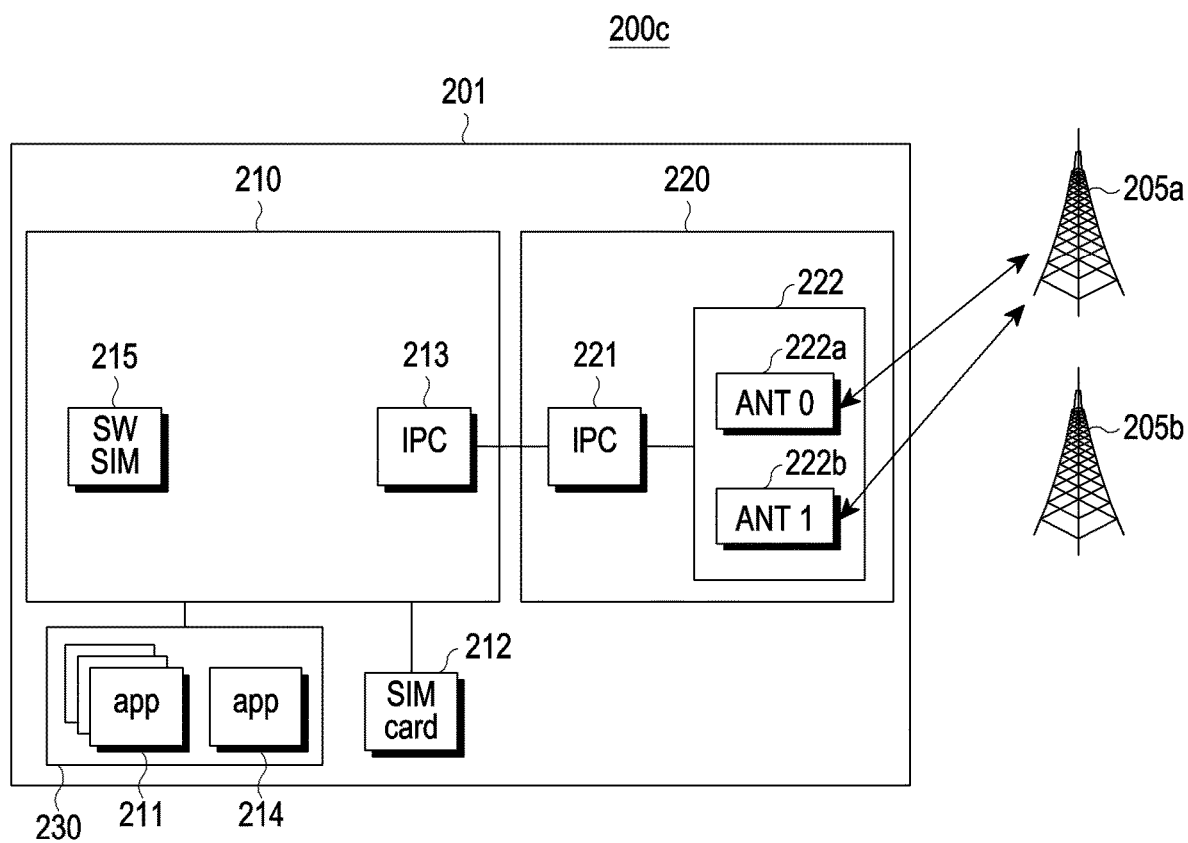

FIGS. 2A, 2B, and 2C are concept views illustrating a process in which an electronic device and at least one of a plurality of communication networks connect to each other according to various embodiments of the disclosure.

Referring to FIGS. 2A, 2B, and 2C, an electronic device 201 (e.g., the electronic device 101 of FIG. 1) may include a processor 210 (e.g., the processor 120 of FIG. 1), a communication circuit 220 (e.g., the communication module 190 of FIG. 1), a SIM card 212 (e.g., the SIM 196 of FIG. 1), and a memory 230 (e.g., the memory 130 of FIG. 1). The processor 210 may include a software SIM card 215 and an inter-processor communication (IPC) 213. The memory 230 may include a first application 211 (e.g., the application 146 of FIG. 1) and a second application 214 (e.g., the application 146 of FIG. 1). The communication circuit 220 may include an IPC 221 and an antenna 222. The antenna 222 may include a plurality of antennas (e.g., a first antenna 222a and a second antenna 222b). The first antenna 222a (ANT 0) may include an antenna (not shown) which serves as a transmitter and an antenna (not shown) which serves as a receiver. The second antenna 222b (ANT 1) may include an antenna (not shown) which serves as a transmitter and an antenna (not shown) which serves as a receiver.

FIGS. 2A, 2B, and 2C illustrate examples in which the electronic device 201 includes the SIM card 212 and the software SIM card 215. The SIM card 212 may include a hardware SIM card which is physically mounted in a slot of the electronic device 201 and operated. The software SIM card 215 may be included in the memory 230 or processor 210 of the electronic device 201. According to an embodiment, the electronic device 201 may include a plurality of SIM cards regardless of types or kinds. For example, the electronic device 201 may include a physical SIM card and a software SIM card, or a plurality of physical SIM cards, or a plurality of software SIM cards. The electronic device 201 is not limited as including only one or a particular number of SIM cards. According to an embodiment, the electronic device 201 may include a software SIM card (not shown) included in the memory 230 and the software SIM card 215 included in the processor 210.

FIG. 2A is a concept view 200a illustrating a process in which the electronic device 201 connects to a first communication network 205a (e.g., the second network 199 of FIG. 1) among a plurality of networks (e.g., the first network 198 and the second network 199 of FIG. 1) according to execution of the first application 211 (e.g., the application 146 of FIG. 1). The electronic device 201 may use communication networks based on information about the user of the electronic device 201 stored in the SIM card 212.

The processor 210 may identify a request for executing the first application 211. As the first application 211 is executed, at least one operation of the first application 211 may include performing data communication with an external electronic device (e.g., the external electronic device 104 of FIG. 1) using communication networks. The processor 210 may identify information about the communication network allocated to the first application 211 based on the identification information about the first application 211 stored in the memory 230 according to the request for executing the first application 211. The communication network separately allocated to the first application 211 may differ the communication network determined according to the information about the user of the electronic device 201 stored in the SIM card 212 of the electronic device 201.

Referring to FIG. 2A, upon identifying that there is no information about a separate communication network designated to the first application 211 based on the identification information about the first application 211, the processor 210 may connect the designated communication network to the electronic device 201. The processor 210 may identify the communication network designated for the electronic device 201 as the first communication network 205a based on the communication network according to the information about the user of the electronic device 201 stored in the SIM card 212 included in the electronic device 201. The IPC 213 of the processor 210 may include inter-processor channel information which indicates the identification information about the first communication network 205a in the electronic device 201 and send a request for connection to the first communication network 205a to the communication circuit 220 to execute at least one operation of the first application 211. The IPC 213 of the processor 210 may make different settings to the inter-processor channel information, thereby allowing for use of different communication networks for data communication. For example, the IPC 213 of the processor 210 may make different definitions for the inter-processor channel information for data communication via the first communication network 205a and the inter-processor channel information for data communication via a second communication network 205b. The communication circuit 220 may receive a request for connection to the first communication network 205a including the inter-processor channel information from the IPC 213 of the processor 210 and perform connection to the first communication network 205a designated for the electronic device 201 based on the inter-processor channel information. The communication circuit 220 may use a plurality of antennas (e.g., the first antenna 222a and the second antenna 222b) for connection to any one of the plurality of networks (e.g., the first communication network 205a and the second communication network 205b) according to software defined radio (SDR). The communication circuit 220 may set a plurality of antennas according to multi-input multi-output (MIMO) technology to use any one of the plurality of networks and may separately group the plurality of antennas into at least two or more combinations according to dual SIM dual active (DSDA) technology to use two or more of the plurality of networks. For example, the communication circuit 220 may connect the antenna 222 to the first communication network 205a via MIMO technology. The communication circuit 220 may send a request for data communication to a communication server which provides the first communication network 205a. When a network channel for data communication for the first communication network 205a for the electronic device 201 is allocated by the communication server, the electronic device 201 may perform at least one operation of the first application 211 via the first communication network 205a.

FIG. 2B is a concept view 200b illustrating a process in which the electronic device 201 connects to the second communication network 205b, among the plurality of networks (e.g., the first network 198 and the second network 199 of FIG. 1), according to execution of the second application 214 (e.g., the application 146 of FIG. 1) while the first application 211 (e.g., the application 146 of FIG. 1) is running via the first communication network 205a (e.g., the second network 199 of FIG. 1). The electronic device 201 may connect to the second communication network 205b according to the software SIM card 215 allocated to the second application 214 while using the first communication network 205a based on the information about the user of the electronic device 201 stored in the MI card 212.

The processor 210 may identify the request for executing the second application 214 while the first application 211 is running. The processor 210 may identify information about the communication network allocated to the second application 214 based on the identification information about the second application 214 stored in the memory 230. The communication network separately allocated to the second application 214 may differ the communication network determined according to the information about the user of the electronic device 201 stored in the SIM card 212 of the electronic device 201.

Referring to FIG. 2B, the processor 210 may identify that the second communication network 205b has been allocated to the second application 214 based on the identification information about the second application 214 stored in the memory 230. The processor 210 may identify the information about the second communication network 205b stored in the software SIM card 215 to connect to the second communication network 205b. The IPC 213 of the processor 210 may include inter-processor channel information indicating the second communication network 205b and send a request for connection to the second communication network 205b to the communication circuit 220 to execute at least one operation of the second application 214. The communication circuit 220 may receive the request for connection to the second communication network 205b including the inter-processor channel information from the IPC 213 of the processor 210 and perform connection to the second communication network 205b allocated to the second application 214 based on the inter-processor channel information. The communication circuit 220 may vary information about the antenna 222 allocated to the first communication network 205a in response to the reception of the request for connection to the second communication network 205b while in connection with the first communication network 205a according to the first application 211. For example, the communication circuit 220 may delete the information about the antenna 222 allocated to the first communication network 205a, allocate the first antenna 222a to the first communication network 205a, and allocate the second antenna 222b to the second communication network 205b. The first antenna 222a and the second antenna 222b may connect to the first communication network 205a and the second communication network 205b, respectively, according to DSDA technology. According to an embodiment, the electronic device 201 may perform data communication based on at least one operation of the first application 211 via the first communication network 205a and perform data communication based on at least one operation of the second application 214 via the second communication network 205b. Performing the operation of the first application 211 via the first communication network 205a by the electronic device 201 may be based on information about the SIM card 212, and the fees for data communication may be charged to the SIM card 212. Performing the operation of the second application 214 via the second communication network 205b by the electronic device 201 may be based on information about the software SIM card 215, and the fees for data communication may be charged to the software SIM card 215. The electronic device 201 may charge data communication fees according to the execution of the application based on the information about the SIM card.

According to an embodiment, when the connection to the second communication network 205b designated for the second application 214 fails according to the request for execution of the second application 214, the electronic device 201 may use the first communication network 205a to execute the second application 214. The communication circuit 220 may receive the request for connection to the second communication network 205b including the inter-processor channel information from the IPC 213 of the processor 210 and send a request for connection to the second communication network 205b allocated to the second application 214 to the server providing the second communication network 205b based on the inter-processor channel information. Upon receiving a response indicating that connection to the second communication network 205b is impossible from the server or upon failing to receive a response to communication connection from the server within a designated time, the communication circuit 220 may determine that it is impossible to connect to the second communication network 205b. As connection to the second communication network 205b fails, the communication circuit 220 may execute the second application 214 using the first communication network 205a. The electronic device 201 may provide information indicating that the second application 214 is executed using the first communication network 205a to the user via the display device 160.

FIG. 2C is a concept view 200c illustrating a process in which the electronic device 201 makes an additional connection to the first communication network 205a according to execution of the second application 214 (e.g., the application 146 of FIG. 1) while the first application 211 (e.g., the application 146 of FIG. 1) is running via the first communication network 205a (e.g., the second network 199 of FIG. 1). The electronic device 201 may connect to the first communication network 205a according to the software SIM card 215 allocated to the second application 214 while using the first communication network 205a based on the information about the user of the electronic device 201 stored in the SIM card 212. In this case, the user of the electronic device 201 may be charged for the fees of data communication according to the execution of the first application 211 based on the SIM card 212, and the service provider of the second application 214 may be charged for the data communication fees according to the execution of the second application 214 based on the software SIM card 215.

The processor 210 may identify the request for executing the second application 214 while the first application 211 is running. The processor 210 may identify information about the communication network allocated to the second application 214 based on the identification information about the second application 214 stored in the memory 230.

Referring to FIG. 2C, the processor 210 may determine that the first communication network 205a has been allocated to the second application 214. The processor 210 may identify information about the first communication network 205a stored in the software SIM card 215 to connect to the first communication network 205a so as to perform at least one operation of the second application 214. The IPC 213 of the processor 210 may include inter-processor channel information indicating the first communication network 205a and send a request for connection to the first communication network 205a to the communication circuit 220 to execute at least one operation of the second application 214. While in connection with the first communication network 205a using the first antenna 222a to perform at least one operation of the first application 211, the electronic device 201 may use the second antenna 222b to make an additional connection to the first communication network 205a to perform at least one operation of the second application 214. According to an embodiment, the IPC 213 of the processor 210 may make different definitions for the inter-processor channel information for connection to the first communication network 205a to execute the first application 211 and the inter-processor channel information for connection to the first communication network 205a to execute the second application 214. The communication circuit 220 may connect to the first communication network 205a based on the received inter-processor channel information. The communication circuit 220 may vary the communication network information set in the antenna 222 in response to the reception of a request for additional connection to the first communication network 205a according to the execution of the second application 214 while in connection with the first communication network 205a according to the execution of the first application 211. The communication circuit 220 may maintain the information about the first antenna 222a allocated to the first communication network 205a according to the execution of the first application 211 and additionally allocate the second antenna 222b for connection to the first communication network 205a according to the execution of the second application 214. The first antenna 222a and the second antenna 222b may connect to the first communication network 205a independently from each other. In the above embodiment, the fees for using the first communication network 205a for may be charged to a first user determined according to the information about the SIM card 212, and the fees for using the first communication network 205a for the second application 214 may be charged to a second user determined according to the information about the software SIM card 215.

Figure 3:
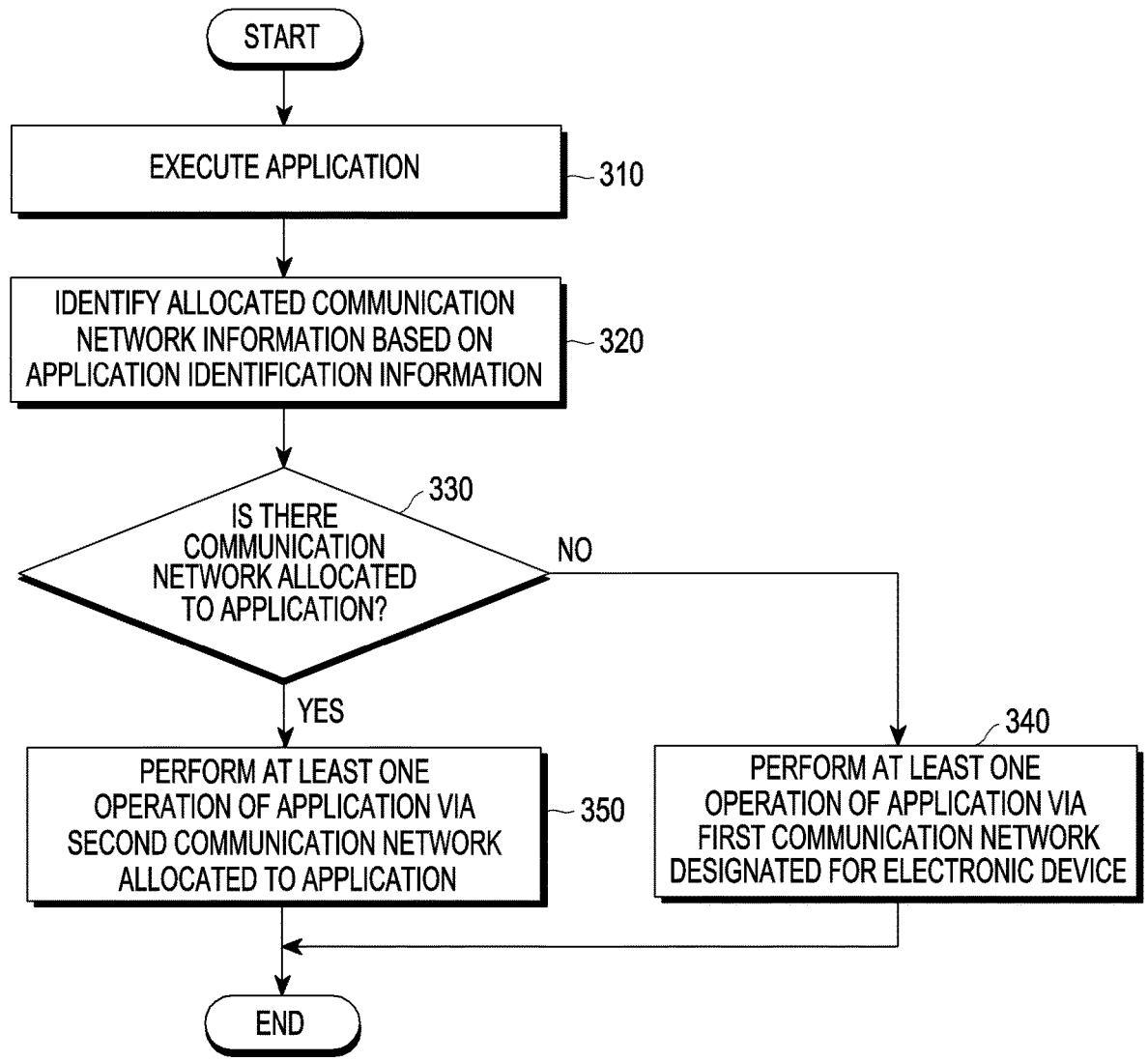
FIG. 3 is a flowchart illustrating a method for operating an electronic device according to an embodiment of the disclosure.

FIG. 3 is a flowchart illustrating a method for operating an electronic device according to an embodiment of the disclosure.

Referring to FIG. 3, in operation 310, an electronic device (e.g., the electronic device 201 of FIGS. 2A to 2C or the processor 210) may identify a request for executing an application (e.g., the first application 211 or second application 214 of FIGS. 2A to 2C). According to an embodiment, 'electronic device 201 performs a particular operation' may be understood as 'the particular operation is performed by the processor 210' or 'the particular operation is performed by a hardware component other than the processor 210 under, or without, the control of the processor 210.' Or, 'electronic device 201 performs a particular operation' may also be understood as 'the particular operation is performed by the processor 210 or other hardware as instructions stored in the memory 230 are executed.' For example, the electronic device 201 may identify the request for executing the first application 211 or the second application 214 by identifying various types of user inputs or that a particular execution condition is met. The first application 211 or the second application 214 may be created to provide one or more functions using a communication network (e.g., the first communication network 205a or the second communication network 205b of FIGS. 2A to 2C). For example, the first application 211 or the second application 214 may transmit data to an external electronic device (e.g., the external electronic device 102 or the external electronic device 104) or receive data from the external electronic device 102 or 104 using the first communication network 205a or the second communication network 205b. The electronic device 201 may include a display (e.g., the display device 160 of FIG. 1) and display an icon for executing the first application 211 or the second application 214 on the display device 160. The electronic device 201 may identify that a request for executing the first application 211 or the second application 214 occurs according to a user input of selecting the icon displayed on the display device 160.

In operation 320, the electronic device 201 may identify information about a communication network separately allocated to the first application 211 or the second application 214 based on identification information about the first application 211 or the second application 214 stored in the memory 230. The information about the first application 211 or the second application 214 and the information about the first communication network 205a or the second communication network 205b may be stored in the memory 230. The information about the first application 211 or the second application 214 may be stored in the memory 230 if the first application 211 or the second application 214 is first installed on the electronic device 201, and the information about the first application 211 or the second application 214 may be varied as the first application 211 or the second application 214 is updated. The update of the first application 211 or the second application 214 may be requested by the user or the distributer of the first application 211 or the second application 214. The identification information about the first application 211 or the second application 214 may be stored in the memory 230 including the information about the first application 211 or the second application 214. The identification information about the first application 211 or the second application 214 may include information about the first communication network 205a or the second communication network 205b necessary for executing the first application 211 or the second application 214. For example, the communication network information necessary for executing the first application 211 or the second application 214 may be designated by the creator of the first application 211 or the second application 214. According to an embodiment, the communication network information designated for the first application 211 or the second application 214 may include at least one of the use period and limit according to the service provider who provides the service via the first application 211 or the second application 214 and the use period and limit according to information about the user of the first application 211 or the second application 214. The service provider who provides the service via the first application 211 or the second application 214 may be identical to the creator of the first application 211 or the second application 214. One or more communication networks (e.g., the first communication network 205a or the second communication network 205b) may be allocated to the first application 211 or the second application 214. Relationship information between the first application 211 or the second application 214 and the first communication network 205a or the second communication network 205b corresponding thereto may be defined by the above-described communication network information. For example, the creator of the first application 211 or the second application 214 may discuss a particular communication network service provider, e.g., for promotion purposes and make a contract so that the network of the particular communication service provider handles data from the first application 211 or the second application 214. In this case, the identification information about the first application 211 or the second application 214 may include information for identifying the network of the particular communication service provider.

In operation 330, the electronic device 201 may identify whether there is a communication network (e.g., the first communication network 205a or the second communication network 205b) allocated to the first application 211 or the second application 214 based on information about the first application 211 or the second application 214 stored in the memory 230. When the identification information about the first application 211 or the second application 214 includes no communication network information allocated to the first application 211 or the second application 214, the electronic device 201 may identify that there is no communication network allocated to the first application 211 or the second application 214. When the identification information about the first application 211 or the second application 214 includes one or more pieces of communication network information allocated to the first application 211 or the second application 214, the electronic device 201 may identify that there is a communication network allocated to the first application 211 or the second application 214.

Upon identifying that there is a communication network allocated to the first application 211 or the second application 214, the electronic device 201 may additionally identify a credit for using the communication network allocated to the first application 211 or the second application 214. The electronic device 201 may identify the use period and limit according to the identification information about the electronic device 201 based on the communication network information for the first application 211 or the second application 214 stored in the memory 230. For example, the identification information about the electronic device 201 may be international mobile equipment identity (IMEI), and the use period and limit set according to the IMEI may be unlimited. The electronic device 201 may identify whether the use period and limit according to the service provider who provides the service via the first application 211 or the second application 214 are met based on the communication network information for the first application 211 or the second application 214 stored in the memory. For example, the service provider providing the service via the first application 211 or the second application 214 may be the creator of the first application 211 or the second application 214 who has distributed the first application 211 or the second application 214, the user period may be one month from the date of distribution, and the use limit may be 1 GB. The electronic device 201 may identify whether the use period and limit according to the user of the first application 211 or the second application 214 are met based on the communication network information for the first application 211 or the second application 214 stored in the memory 230. The electronic device 201 may access an external server of the service provider that provides the service via the first application 211 or the second application 214 based on user identification information (e.g., identity (ID) and password) for the first application 211 or the second application 214, thereby identifying the user information. Upon identifying that the use credit for the communication network (e.g., the first communication network 205a or the second communication network 205b) designated for the first application 211 or the second application 214 is valid, the electronic device 201 may determine that the communication network finally designated is available.

In operation 340, upon determining that there is no communication network allocated to the first application 211 or the second application 214, the electronic device 201 may perform at least one operation of the first application 211 or the second application 214 via a first communication network (e.g., the first communication network 205a of FIG. 2A) designated for the electronic device 201 as shown in FIG. 2A. The electronic device 201 may include one or more SIM cards (e.g., the SIM card 212 of FIG. 2A). The electronic device 201 may connect to a communication network based on information about a first SIM card (e.g., the SIM card 212 of FIG. 2A) among one or more SIM cards (e.g., the SIM card 212 of FIG. 2A). Upon determining that there is a communication network allocated to the first application 211 or the second application 214 but the use credit is invalid so that the finally designated communication network is unavailable, the electronic device 201 may perform at least one operation of the first application 211 or the second application 214 via the first communication network 205a designated for the electronic device 201. The SIM card 212 may be one of a smart card type which is inserted into the electronic device 201. For example, the SIM card 212 may support connection to the first communication network 205a which is provided by the particular wireless network service for which the user of the electronic device 201 has signed up. Upon determining that there is no separate communication network designated for the application, the electronic device 201 may connect to the first communication network 205a via the SIM card 212 of the electronic device 201, thereby performing at least one operation of the first application 211 or the second application 214. For example, the electronic device 201 may transmit data generated from the first application 211 or the second application 214 via the first communication network 205a to an external electronic device (e.g., the external electronic device 104 of FIG. 1). The electronic device 201 may receive data necessary for executing the first application 211 or the second application 214 from the external electronic device (e.g., the external electronic device 104 of FIG. 1) or a server (e.g., the server 108 of FIG. 1) via the first communication network 205a. According to an embodiment, the fees for data communication via the first communication network 205a by the electronic device 201 may be included in the fee information of the SIM card 212 of the electronic device 201.

In operation 350, upon determining that there is a separate communication network allocated to the first application 211 or the second application 214, the electronic device 201 may perform at least one operation of the application (e.g., the second application 214) via a second communication network (e.g., the second communication network 205b of FIG. 2B) allocated to the application (e.g., the second application 214 of FIG. 2B) as shown in FIG. 2B. Upon determining that there is a separate communication network allocated to the application (e.g., the second application 214) and the use credit for the allocated communication network is valid, the electronic device 201 may perform at least one operation of the application (e.g., the second application 214) via the allocated communication network. The electronic device 201 may connect to any one of the plurality of networks using the communication circuit (e.g., the communication circuit 220 of FIGS. 2A to 2C). The electronic device 201 may connect to the second communication network 205b based on the communication network information allocated to the application (e.g., the second application 214) among the plurality of network. The second communication network 205b may be a communication network different from the first communication network 205a designated for the electronic device 201. The plurality of communication networks may be distinguished by the communication network service provider and the entity that pays for the communication network. For example, when the communication fees for the communication network connected for executing the first application 211 or the second application 214 are charged to the information about the user of the electronic device 201 and when the communication fees are charged to the service provider who provides the service via the first application 211 or the second application 214 may be regarded as using different communication networks. The electronic device 201 may distinguish the information about the communication network according to the information about the user of the electronic device 201 from the information about the communication network allocated to the first application 211 or the second application 214 based on the SIM card information. The electronic device 201 may include one or more SIM cards which may include a smart card-type embedded SIM card or a software SIM card stored in the electronic device 201. The software SIM card may be stored in the memory 230 of the electronic device 201 or in the processor 210 of the electronic device 201. For example, the software SIM card may be stored in the processor 210 based on Trustzone technology. One or more SIM cards may include information about the first communication network 205a or the second communication network 205b. For example, the embedded SIM card may include information about the wireless network service for connection to the communication network for which the user of the electronic device 201 has signed up. The software SIM card may include information for connection to an extra communication network allocated to the application separately from the communication network for which the user of the electronic device 201 has signed up. As another example, the first software SIM card may include information about the wireless network service for connection to the communication network for which the user of the electronic device 201 has signed up, and the second software SIM card may include information for connection to an additional communication network other than the communication network for which the user of the electronic device 201 has signed up. According to an embodiment, the first communication network 205a and the second communication network 205b may be communication networks of the same service provider in which case the first communication network 205a and the second communication network 205b may be distinguished as logical networks.

Figure 4:
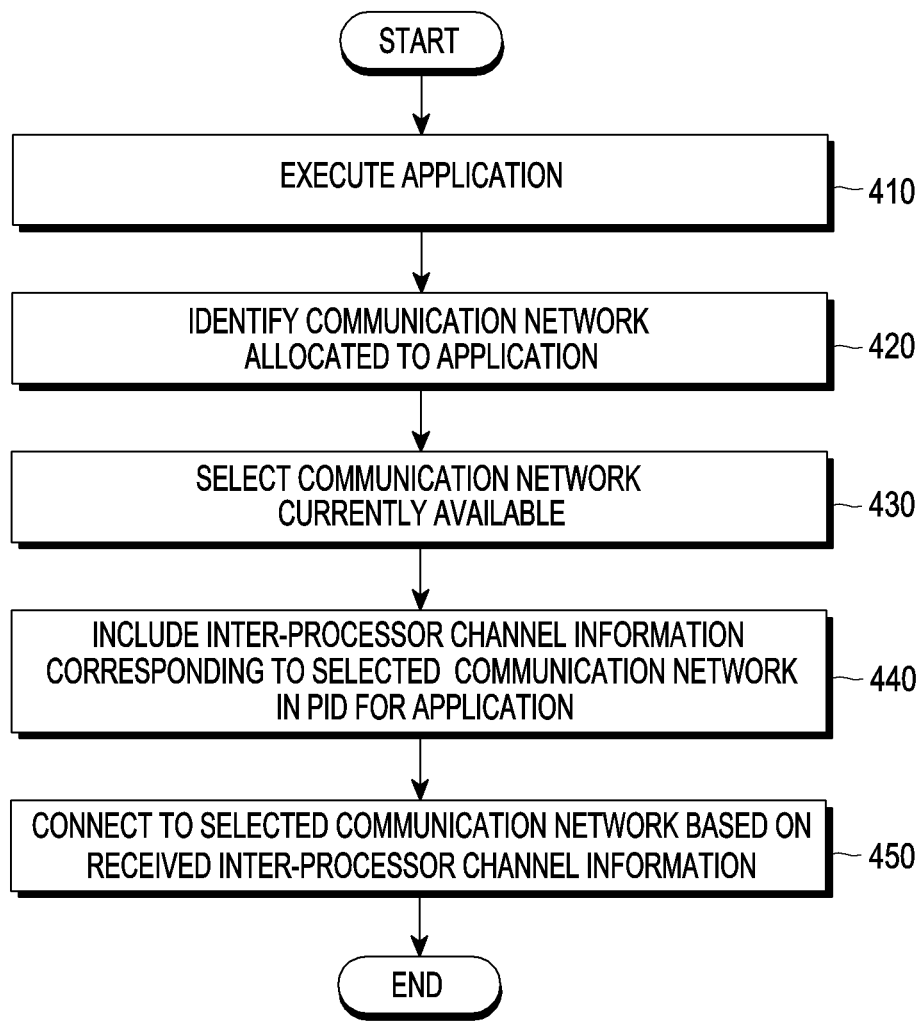
FIG. 4 is a flowchart illustrating a method of operation of connecting to a communication network for a running application of an electronic device according to an embodiment of the disclosure.

FIG. 4 is a flowchart illustrating a method of operation of connecting to a communication network for a running application of an electronic device according to an embodiment of the disclosure.

In operation 410, an electronic device (e.g., the electronic device 201 of FIGS. 2A to 2C) may identify a request for executing an application (e.g., the first application 211 or the second application 214 of FIGS. 2A to 2C).

In operation 420, the electronic device 201 may identify a communication network (e.g., the first communication network 205a or the second communication network 205b) allocated to the first application 211 or the second application 214 based on information about the first application 211 or the second application 214 stored in the memory (e.g., the memory 230 of FIGS. 2A to 2C). For example, as shown in FIG. 2B, the electronic device 201 may identify that the first communication network 205a has been designated for the first application 211 based on the information about the first application 211 stored in the memory 230 or may identify that the second communication network 205b has been designated for the second application 214 based on the information about the second application 214 stored in the memory 230. The electronic device 201 may identify that a plurality of communication networks have been designated for the first application 211 or the second application 214 based on the information about the first application 211 or the second application 214 stored in the memory 230.

In operation 430, the electronic device 201 may select a communication network, which is currently available, among at least one communication network (e.g., the first communication network 205a or the second communication network 205b) allocated to the first application 211 or the second application 214. The electronic device 201 may select, in real-time, the optimal one among the at least one communication network allocated to the application by reflecting the area where the electronic device 201 is located, the communication network status at the time when the first application 211 or the second application 214 was requested to be executed, or the communication properties the electronic device 201 supports. For example, the electronic device 201 may select the communication network where the smoothest data transmission is possible in the real-time location of the electronic device 201 from among the at least one communication network allocated to the first application 211 or the second application 214.

Figure 5:
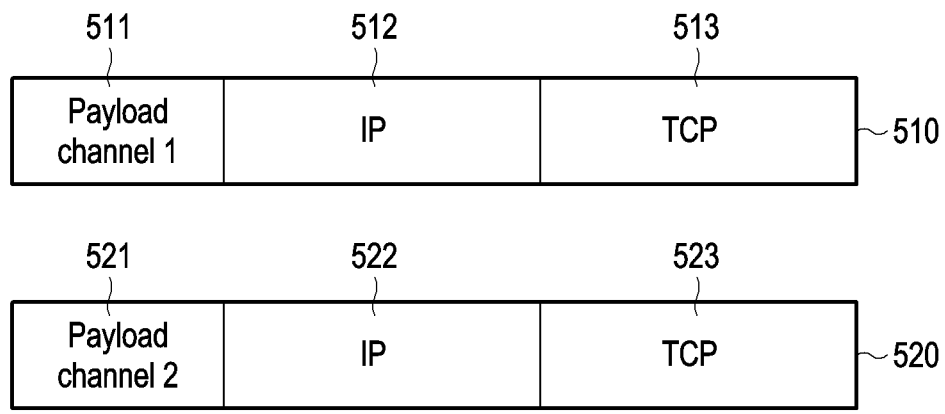
FIG. 5 is a view illustrating a packet structure for communication network connection in an electronic device according to an embodiment of the disclosure.

In operation 440, the electronic device 201 may include the inter-processor channel information corresponding to the selected communication network in the process ID (PID) for the first application 211 or the second application 214. FIG. 5 illustrates an example packet structure which the processor (e.g., the processor 210 of FIGS. 2A to 2C) includes the inter-processor channel information in and transmits to the communication circuit (e.g., the communication circuit 220 of FIGS. 2A to 2C). The processor 210 of the electronic device 201 may transfer a data packet for executing the first application 211 or the second application 214 including the inter-processor channel information to the communication circuit 220.

In operation 450, the electronic device 201 may perform connection to the selected communication network based on the inter-processor channel information received via the communication circuit 220. The communication circuit 220 of the electronic device 201 may generate a data packet including the communication network information about the selected communication network and perform connection to the communication network based on the communication network information. If necessary, the communication circuit 220 may vary information about a plurality of antennas (e.g., the first antenna 222a and the second antenna 222b of FIGS. 2A to 2C) allocated to the communication network. For example, the communication circuit 220 may separately or individually allocate the plurality of antennas to the plurality of communication networks in response to a plurality of network connection requests corresponding to difference pieces of inter-processor channel information.

FIG. 5 is a view illustrating a data packet structure for communication network connection in an electronic device according to an embodiment of the disclosure.

Referring to FIG. 5, a processor (e.g., the processor 210 of FIGS. 2A to 2C or the IPC 213) of an electronic device (e.g., the electronic device 201 of FIGS. 2A to 2C) may transfer a data packet including inter-processor channel information to a communication circuit (e.g., the communication circuit 220 of FIGS. 2A to 2C or the IPC 221) for connection to a communication network (e.g., the first communication network 205a or the second communication network 205b of FIGS. 2A to 2C) according to execution of an application (e.g., the first application 211 or the second application 214 of FIGS. 2A to 2C). The electronic device 201 may determine any one of communication networks among a plurality of communication networks (e.g., the first communication network 205a and the second communication network 205b) supported by the electronic device 201 based on the first application 211 or the second application 214. The electronic device 201 may send a request for connection to the communication network according to the execution of the first application 211 or the second application 214, with information about the determined communication network included therein. For example, the IPC 213 may transfer a first data packet 510 or a second data packet 520 including the inter-processor channel information for the communication network and the processor ID information according to the execution of the first application 211 or the second application 214 to the communication circuit 220 or the IPC 221.

Referring to FIG. 5, the first data packet 510 may include a payload region 511, an Internet protocol (IP) region 512, and a transmission control protocol (TCP) region 513. The payload region 511 of the first data packet 510 may include first channel (channel 1) data as inter-processor channel information for communication network connection. For example, the electronic device 201 may include information about the first channel data in the payload region 511 based on a first process ID according to a first process requested to be executed.

The second data packet 520 may include a payload region 521, an IP region 522, and a TCP region 523. The payload region 521 of the second data packet 520 may include second channel (channel 2) data as inter-processor channel information for communication network connection. The electronic device 201 may include information about the second channel data in the payload region 521 based on a second process ID according to a second process requested to be executed. The communication circuit 220 or the IPC 221 may identify that the communication network (e.g., the first communication network 205a of FIGS. 2A to 2C) according to the first data packet 510 differs from the communication network (e.g., the second communication network 205b of FIGS. 2A to 2C) according to the second data packet 520 based on the inter-processor channel information included in the payload region 511 or the payload region 521.

Figure 6:
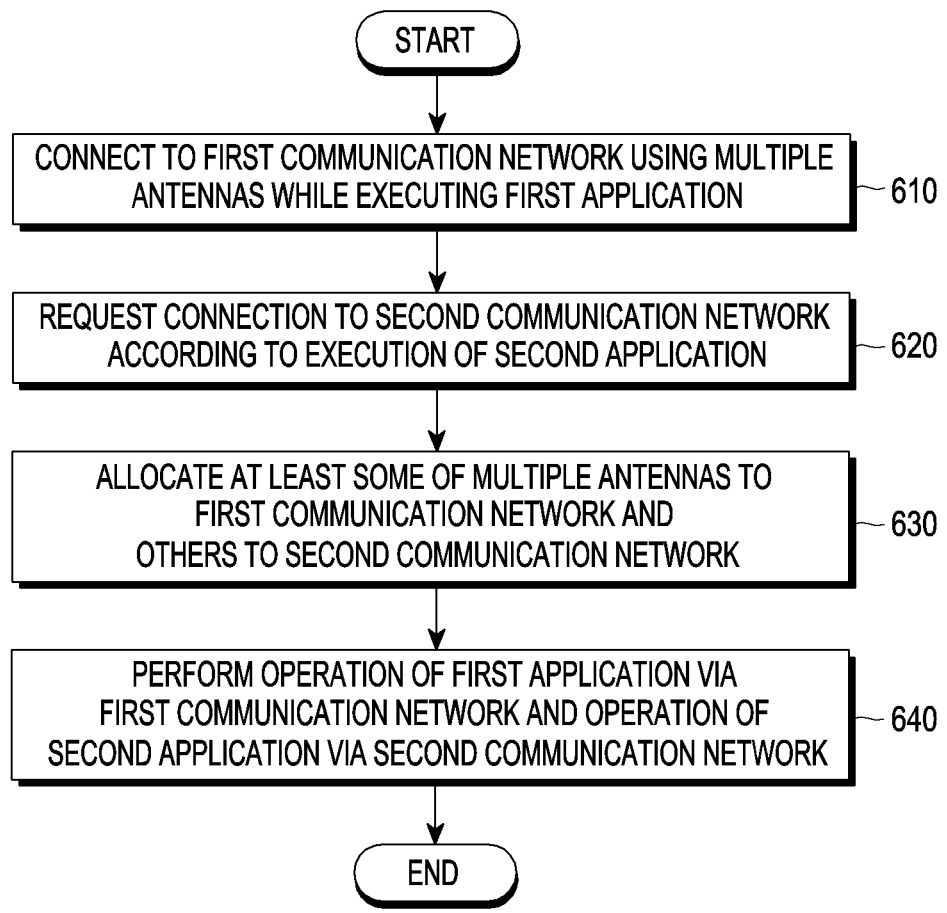
FIG. 6 is a flowchart illustrating a method of operation for allocating a plurality of antennas depending on the type of a communication network in connection of an electronic device according to an embodiment of the disclosure.

FIG. 6 is a flowchart illustrating a method of operation for allocating a plurality of antennas depending on the type of a communication network in connection of an electronic device according to an embodiment of the disclosure.

FIG. 6 is described in greater detail with reference to FIG. 7.

Figure 7:
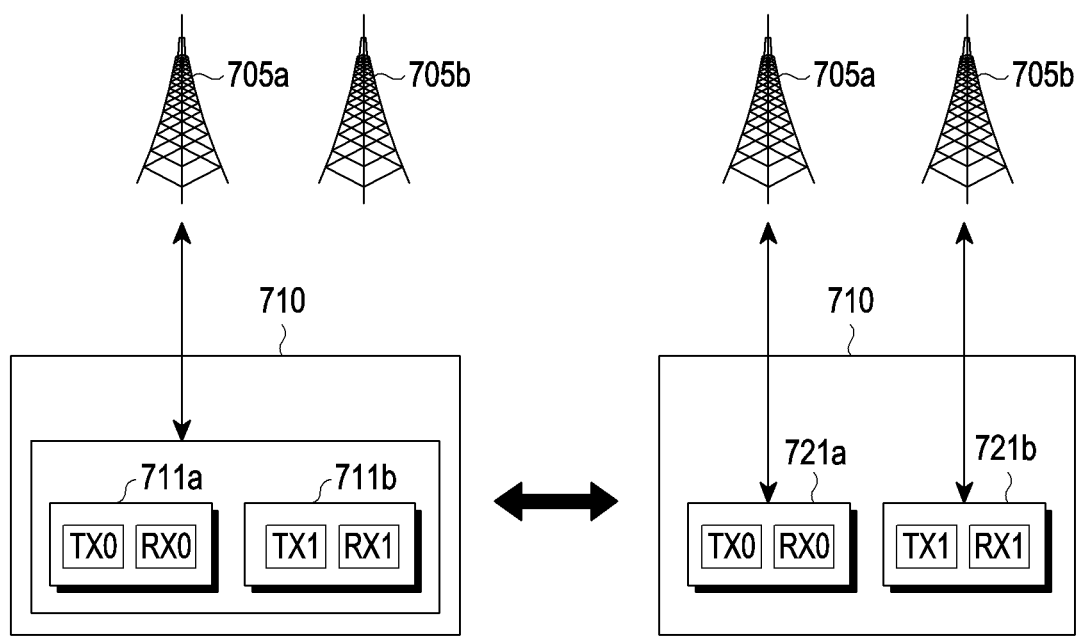
FIG. 7 is a concept view illustrating an example in which an electronic device dynamically connects to at least one of a plurality of networks according to an embodiment of the disclosure.

FIG. 7 is a concept view illustrating an example in which an electronic device dynamically connects to at least one of a plurality of networks according to an embodiment of the disclosure.

Referring to FIGS. 6 and 7, according to an embodiment, an electronic device 710 (e.g., the electronic device 201 of FIGS. 2A to 2C) may include four antennas TX0, TX1, RX0, and RX1. For example, the electronic device 710 may include a first antenna 711a or 721a including a first transmission antenna TX0 and a first reception antenna RX0 and a second antenna 711b or 721b including a second transmission antenna TX1 and a second reception antenna RX1. The electronic device 710 may perform a MIMO operation using the first antenna 711a and the second antenna 711b. The electronic device 710 may operate in DSDA using the first antenna 721a and the second antenna 721b. As an example, although FIG. 7 illustrates an example in which the electronic device 710 includes four antennas, the number of antennas included in the electronic device 710 according to the disclosure is not limited to four, but two or more antennas may be included in the electronic device 710.

In operation 610, the electronic device 710 (e.g., the processor 210) may connect to a first communication network (e.g., the first communication network 205a of FIGS. 2A to 2C) using a plurality of antennas while a first application (e.g., the first application 211 of FIGS. 2A to 2C) is running. For example, referring to FIG. 7, the electronic device 710 may allocate the first antenna 711a and the second antenna 711b to perform a MIMO operation to perform at least one operation of the first application 211. The electronic device 710 may connect to a first communication network 705a among a plurality of communication networks (e.g., the first communication network 705a and a second communication network 705b) using the four antennas TX0, TX1, RX0, and RX1.

In operation 620, the processor 210 may send a request for connection to a second communication network (e.g., the second communication network 205b of FIGS. 2A to 2C) according to the execution of the second application (e.g., the second application 214 of FIGS. 2A to 2C) to the communication circuit 220. The processor 210 may identify the second communication network 205b allocated to the second application 214 based on identification information about the second application 214 according to a request for executing the second application 214. The processor 210 may transfer a request for connection including channel information about the second communication network 205b to the communication circuit 220.

In operation 630, the communication circuit 220 may allocate at least some of the plurality of antennas to the first communication network 205a and the rest of the plurality of antennas to the second communication network 205b. For example, referring to FIG. 7, the electronic device 710 may connect to the first communication network 705a using the first antenna 721a and connect to the second communication network 705b using the second antenna 721b. The communication circuit 220 may dynamically vary allocation information about the plurality of antennas for connection to the plurality of networks according to the application which is running.

In operation 640, the processor 210 may perform an operation of a first application via the first communication network 705a and an operation of a second application via the second communication network 705b. For example, the processor 210 may transmit output data according to the first application via the first communication network 705a to an external electronic device (e.g., the external electronic device 104 of FIG. 1) or transfer data received from the external electronic device 104 to the first application. The processor 210 may transmit output data according to the second application via the second communication network 705b to the external electronic device 104 or transfer data received from the external electronic device 104 to the second application.

Figure 8:
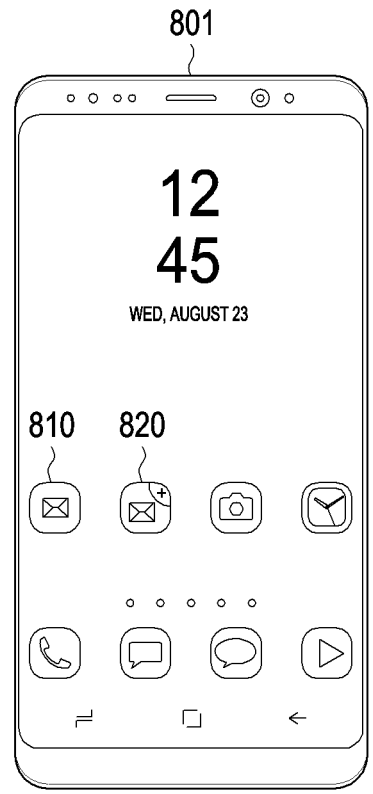
FIG. 8 is a view illustrating a screen displaying icons which indicate applications operated via different communication networks in an electronic device according to an embodiment of the disclosure.

FIG. 8 is a view illustrating a screen displaying icons which indicate applications operated via different communication networks in an electronic device according to an embodiment of the disclosure.

Referring to FIG. 8, an electronic device 801 (e.g., the electronic device 101 of FIG. 1 or the electronic device 201 of FIGS. 2A to 2C) may display a plurality of icons for executing a plurality of applications on a display (e.g., the display device 160 of FIG. 1). The electronic device 801 may display a first icon 810 for executing a first application (e.g., the first application 211 of FIGS. 2A to 2C) providing the function of message transmission via a first network (e.g., the first communication network 205a of FIGS. 2A to 2C) and a second icon 820 for executing the first application via a second network (e.g., the second communication network 205b of FIGS. 2A to 2C). The first icon 810 and the second icon 820 may include the same image to indicate that the first and second icons 810 and 820 are icons for executing the first application. The first icon 810 and the second icon 820 may include additional information (e.g., symbols, additional images, or symbols indicating the communication network) to indicate that the first network or second network is used. The first icon 810 and the second icon 820 may differ in at least one of size, color, or included image. The electronic device 801 may automatically align the first icon 810 and the second icon 820 based on the relationship therebetween. For example, the electronic device 801 may position the second icon 820 adjacent to the first icon 810 all the time and, when the first icon 810 is repositioned, the second icon 820 may also be relocated. When there are one or more applications using the same communication network, the electronic device 801 may align one or more icons for executing one or more applications to be positioned adjacent to each other. The electronic device 801 may include and display additional information for indicating that the same communication network is used in one or more icons which indicate one or more applications using the same communication network. Upon executing a first application by the first icon 810, the electronic device 801 may use the first network and, when the first application is executed by the second icon 820, the electronic device 801 may use the second network. The provider of the first application may provide a service corresponding to the first icon 810 and a service corresponding to the second icon 820. For example, the provider of the first application may charge the user of the electronic device 801 for the fees for the service corresponding to the first icon 810 and charge the service provider who provides the service via the first application for the fees for the service corresponding to the second icon 820. The electronic device 801 may use the SIM card embedded in the electronic device 801 for executing the second application according to the first icon 810 and use the software SIM card stored in the electronic device 801 for executing the first application according to the second icon 820. In this case, the software SIM card may include information about the service provider who provides the service via the first application and information about the second network.

According to an embodiment, the electronic device 801 may display only one icon for executing an application on a menu screen (e.g., a launcher application execution screen). Thereafter, when designation of the icon is detected, the electronic device 801 may display an interface for selecting a network to be used for the application and select a network to be used based on a selection on the interface. A configuration of the interface is described below in greater detail with reference to FIG. 11. Or, when the single icon is designated, the electronic device 101 may transmit or receive application data via the network first set. For example, when such a setting has been made that charging does not occur for a particular network, the electronic device 101 may be configured to transmit and receive data of the application via the network for which charging does not occur when the icon is designated.

Figure 9:
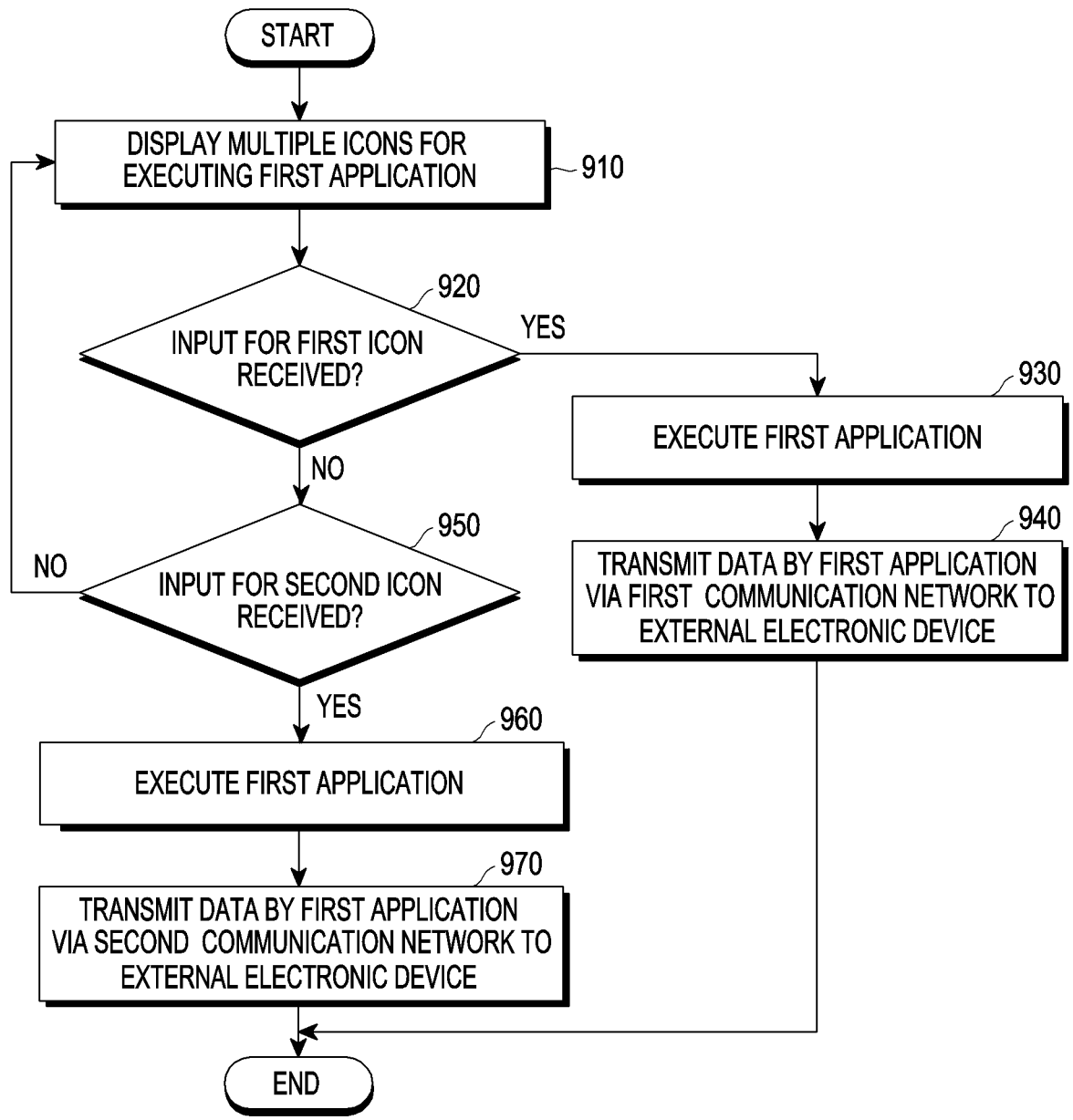
FIG. 9 is a flowchart illustrating a method of operation in which a plurality of applications of an electronic device connects to different communication networks according to an embodiment of the disclosure.

FIG. 9 is a flowchart illustrating a method of operation in which a plurality of applications of an electronic device connects to different communication networks according to an embodiment of the disclosure.

Referring to FIG. 9, in operation 910, an electronic device (e.g., the electronic device 201 of FIGS. 2A to 2C or the electronic device 801 of FIG. 8) may display a plurality of icons for executing a first application (e.g., the first application 211 of FIGS. 2A to 2C) on a display (e.g., the display device 160 of FIG. 1). The plurality of icons (e.g., the first icon 810 and the second icon 820 of FIG. 8) may include a plurality of icons for executing the first application 211 using a first communication network (e.g., the first communication network 205a of FIGS. 2A to 2C) or a second communication network (e.g., the second communication network 205b of FIGS. 2A to 2C). For example, the first icon 810 may execute the first application 211 using the first communication network 205a, and the second icon 820 may execute the first application 211 using the second communication network 205b. The first communication network 205a may be a communication network determined based on information about the user of the electronic device 201. The second communication network 205b may be a communication network separately designated for the first application 211 by the provider of the first application 211. The electronic device 201 may identify whether there is a communication network separately designated for the first application 211 and whether a credit for a separately designated communication network, if any, is valid based on the information about the first application 211 stored in the memory 230. For example, the credit for the separately designated communication network may be defined corresponding to the electronic device 201 or may be defined corresponding to the information about the user of the electronic device 201. The electronic device 201 may display the second icon 820 on the display device 160 in response to identification of a credit for executing the first application 211 using the second communication network 205b.

In operation 920, the electronic device 201 may receive an input to the first icon 810. For example, the electronic device 201 may determine that an input to the first icon 810 has been received by detecting a touch input to the first icon 810 displayed on the display device 160.

In operation 930, upon receiving the input to the first icon 810, the electronic device 201 may execute the first application 211.

In operation 940, the electronic device 201 may transmit data by the first application 211 via the first communication network 205a to an external electronic device (e.g., the external electronic device 104 or the server 108 of FIG. 1) using the communication circuit (e.g., the communication circuit 220 of FIGS. 2A to 2C).

In operation 950, upon receiving no input to the first icon 810, the electronic device 201 may receive an input to the second icon 820. For example, the electronic device 201 may determine that an input to the second icon 820 has been received by detecting a touch input to the second icon 820 displayed on the display device 160.

In operation 960, upon receiving the input to the second icon 820, the electronic device 201 may execute the first application 211.

In operation 970, the electronic device 101 may transmit data by the first application 211 via the second communication network 205b to an external electronic device (e.g., the external electronic device 104 or the server 108 of FIG. 1) using the communication circuit 220.

Figure 10:
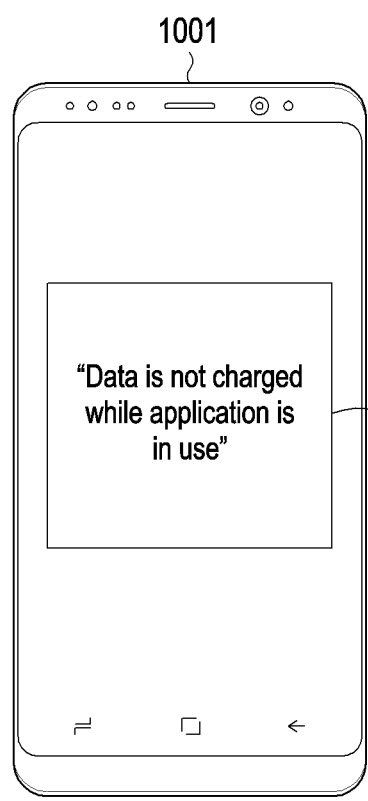
FIG. 10 is a view illustrating an example user interface screen of an electronic device according to an embodiment of the disclosure.

FIG. 10 is a view illustrating an example user interface screen of an electronic device according to an embodiment of the disclosure.

Referring to FIG. 10, an electronic device 1001 (e.g., the electronic device 201 of FIGS. 2A to 2C) may display information about a network service according to execution of an application (e.g., the first application 211 or the second application 214 of FIGS. 2A to 2C) on a display (e.g., the display device 160 of FIG. 1). If the communication fees according to the communication network (e.g., the first communication network 205a or the second communication network 205b of FIGS. 2A to 2C) are on the provider of the first application 211 or the second application 214 for executing the first application 211 or the second application 214, information thereabout may be provided to the user by the electronic device 1001. The electronic device 1001 may output a notification message reading "Data is not charged while application is in use" in a popup window 1010 on the screen of the display device 160.

Figure 11:
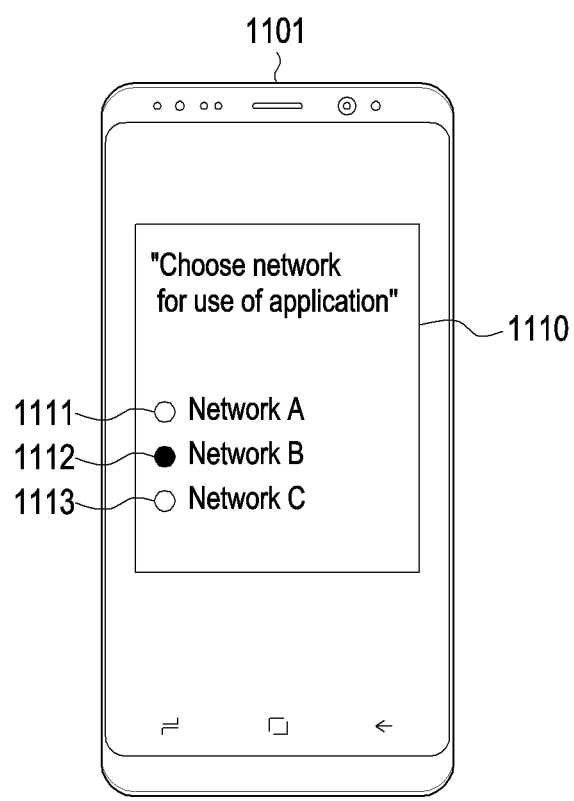
FIG. 11 is a view illustrating an example screen for leading to a user's selection of a network service via a user interface of an electronic device according to an embodiment of the disclosure.

FIG. 11 is a view illustrating an example screen for leading to a user's selection of a network service via a user interface of an electronic device according to an embodiment of the disclosure.

Referring to FIG. 11, an electronic device 1101 (e.g., the electronic device 201 of FIGSs. 2A to 2C) may select a communication network for executing the first application 211 or the second application 214 when a plurality of communication networks are designated for the first application 211 or the second application 214 (e.g., the first application 211 or the second application 214 of FIGS. 2A to 2C). The electronic device 1101 may provide the user with information about the plurality of communication networks and lead to the user's input. For example, upon detecting an input to an icon for executing the first application 211 or the second application 214, the electronic device 1101 may output a notification message reading "Choose network for use of application" in a popup window 1110 when network A 1111, network B 1112, and network C 1113 are designated for the first application 211 or the second application 214. In the popup window 1110, check boxes may be separately or individually displayed for network A 1111, network B 1112, and network C 1113. For example, upon receiving a user input for selecting the check box for network B 1112, the electronic device 1101 may use network B 1112 for executing the first application 211 or the second application 214.

According to an embodiment, an electronic device (e.g., the electronic device 201 of FIGS. 2A to 2C) comprises a communication circuit (e.g., the communication circuit 220 of FIGS. 2A to 2C) configured to support communication through a plurality of communication networks, a display (e.g., the display device 160 of FIG. 1), a memory (e.g., the memory 230 of FIGS. 2A to 2C) configured to store information about a plurality of applications (e.g., the first application 211 and the second application 214 of FIGS. 2A to 2C) and information about the plurality of communication networks, and at least one processor (e.g., the processor 210 of FIGS. 2A to 2C) operatively connected with the communication circuit 220, the display device 160, and the memory 230, wherein the at least one processor (e.g., the processor 210) is configured to identify a request for executing an application, based on identification information about the application, perform at least one operation of the application via a first communication network or a second communication network among the plurality of communication networks, in response to no communication network allocated to the first application 211 or the second application 214 being identified based on the identification information about the first application 211 or the second application 214, perform at least one operation of the first application 211 or the second application 214 via the first communication network (e.g., the first communication network 205a of FIGS. 2A to 2C) designated for the electronic device 201 among the plurality of communication networks, and in response to at least one communication network allocated to the first application 211 or the second application 214 being identified based on the identification information about the first application 211 or the second application 214, perform at least one operation of the first application 211 or the second application 214 via the second communication network (e.g., the second communication network 205b of FIGS. 2A to 2C) allocated to the first application 211 or the second application 214 among the plurality of communication networks.

According to an embodiment, the electronic device 201 further comprises a plurality of antennas (e.g., the antenna 222 of FIGS. 2A to 2C). The communication circuit 220 may be configured to, in response to a connection to the second communication network being requested while the first communication network is in connection, allocate at least one of the plurality of antennas to the first communication network and the rest of the plurality of antennas to the second communication network.

According to an embodiment, the at least one processor may be configured to transmit a data packet including inter-processor channel information to the communication circuit 220 to request a connection to the first communication network or the second communication network.

According to an embodiment, the at least one processor may be configured to designate a first inter-processor channel for the first communication network and a second inter-processor channel for the second communication network, the second inter-processor channel is different from the first inter-processor channel.

According to an embodiment, the first communication network and the second communication network are for data communication, respectively.

According to an embodiment, the electronic device 201 may further comprise a plurality of subscriber identity module (SIM) cards, wherein among the plurality of SIM cards, a first SIM card is configured to support communication through the first communication network, and among the plurality of SIM cards, a second SIM card is configured to support communication through the second communication network.

According to an embodiment, the plurality of SIM cards may include a SIM card (e.g., the SIM card 212 of FIGS. 2A to 2C) embedded in the electronic device 201 or a software SIM card (e.g., the software SIM card of FIGS. 2A to 2C) stored in the processor 210 of the electronic device 201 or the memory 230 of the electronic device 201.

According to an embodiment, the plurality of communication networks may be distinguished per communication network service provider.

According to an embodiment, the processor 210 may be configured to identify a communication network connectible to the electronic device 201 among the at least one communication network allocated to the application and select the as the connectible communication network as the second communication network.

According to an embodiment, the processor 210 may be configured to display information about the plurality of communication networks via the display device 160 and allocate a communication network selected by a user input among the plurality of communication networks as the second communication network.

According to an embodiment, a method for operating an electronic device (e.g., the electronic device 201 of FIGS. 2A to 2C) comprises identifying a request for executing an application (e.g., the first application 211 or the second application 214 of FIGS. 2A to 2C), based on identification information about the application, performing at least one operation of the application via a first communication network or a second communication network among a plurality of communication networks, the performing of the at least one operation of the application comprising, in response to no communication network allocated to the application being identified based on the identification information about the application, performing at least one first operation of the application via the first communication network designated for the electronic device 201 among the plurality of communication networks, and in response to at least one communication network allocated to the application being identified based on the identification information about the application, performing at least one second operation of the application via the second communication network allocated to the application among the plurality of communication networks.

According to an embodiment, as part of performing the at least one operation of the application via the second communication network, by a communication circuit (e.g., the communication circuit 220 of FIGS. 2A to 2C) of the electronic device 201, allocating at least one of a plurality of antennas included in the electronic device 201 to the first communication network and the rest of the plurality of antennas to the second communication network in response to a request for a connection to the second communication network while the first communication network is in connection.

According to an embodiment, as part of performing the at least one operation of the application via the first communication network or the second communication network, by at least one processor (e.g., the processor 210) of the electronic device 201, transmitting a data packet including inter-processor channel information for the first communication network or the second communication network to the communication circuit 220 of the electronic device 201.

According to an embodiment, the first communication network and the second communication network are for data communication. An inter-processor channel designated for the first communication network may be different from an inter-processor channel designated for the second communication network.

According to an embodiment, a communication through the first communication network may be supported via a first SIM card among a plurality of SIM cards included in the electronic device 201, and a communication through the second communication network may be supported via a second SIM card among the plurality of SIM cards.

According to an embodiment, a communication through the first communication network may be supported via a SIM card (e.g., the SIM card 212 of FIGS. 2A to 2C) embedded in the electronic device 201, and the second communication network may be supported via a software SIM card (e.g., the software SIM card 215 of FIGS. 2A to 2C) stored in the processor 210 of the electronic device 201 or a memory (e.g., the memory 230 of FIGS. 2A to 2C) of the electronic device 201.

According to an embodiment, the first communication network and the second communication network may be distinguished depending on communication network service providers.

According to an embodiment, the method further comprises, when a plurality of communication networks are allocated to the application, designating a communication network connectible to the electronic device 201 among the plurality of communication networks as the second communication network.

According to an embodiment, an electronic device (e.g., the electronic device 201 of FIGS. 2A to 2C) comprises a display (e.g., the display device 160 of FIG. 1), a communication circuit (e.g., the communication circuit 220 of FIGS. 2A to 2C) configured to support communication through a plurality of communication networks, at least one processor (e.g., the processor 210 of FIGS. 2A to 2C) operatively connected with the display device 160 and the communication circuit 220, and a memory (e.g., the memory 230 of FIGS. 2A to 2C) operatively connected with the at least one processor and storing information about a plurality of applications (e.g., the first application 211 or the second application 214 of FIGS. 2A to 2C) and information about a plurality of communication networks, wherein the memory 230 stores instructions that, when executed, cause the at least one processor to display, on the display device 160, a first icon for executing the first application 211 via a first communication network and a second icon for executing the first application 211 via a second communication network different from the first communication network, in response to a selection of the first icon being identified, execute the first application 211 and control the communication circuit 220 to transmit data by the first application 211 via the first communication network to an external electronic device (e.g., the external electronic device 104 of FIG. 1), and in response to a selection of the second icon being identified, execute the first application 211 and control the communication circuit 220 to transmit the data by the first application 211 via the second communication network to the external electronic device 104.

According to an embodiment, the instructions enable the at least one processor to display the second icon on the display device 160 in response to identification of a credit for executing the first application 211 via the second communication network.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "Pt" and "2nd," or "first" and "second" may be used to simply distinguish a corresponding component from another, and does not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As is apparent from the foregoing description, according to various embodiments, there may be provided an electronic device for scheduling a wireless network service according to an application which is running and a method of operating the electronic device.

According to various embodiments, an electronic device may perform at least one operation of an application according to a wireless network service allocated to the application.

According to various embodiments, an electronic device may connect to a wireless network service allocated to an application in execution using a plurality of antennas.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a communication circuit configured to support communication through a plurality of communication networks;
   a display;
   a plurality of antennas;
   a memory configured to store information about a plurality of applications and information about the plurality of communication networks; and
   at least one processor operatively connected with the communication circuit, the display, and the memory,
   wherein the at least one processor is configured to:
      identify a request for executing an application among the plurality of applications,
      in response to identifying the request for executing the application, identify information about a communication network allocated to the application based on information about the application stored in the memory, the identified information about the communication network comprising communication network information necessary for executing the application,
      in response to a first communication network allocated to the application being identified based on the identified information, perform an operation of the application via the first communication network provided by a first communication network service provider among the plurality of communication networks,
      in response to a second communication network allocated to the application being identified based on the identified information, perform an operation of the application via the second communication network provided by a second communication network service provider among the plurality of communication networks, and
      in response to no communication network allocated to the application being identified based on the identified information, perform an operation of the application via a communication network designated for the electronic device, and
   wherein the communication circuit is further configured to, in response to a connection to the second communication network being requested while the first communication network is connected, allocate at least one of the plurality of antennas to the first communication network and remaining antennas of the plurality of antennas to the second communication network.

2. The electronic device of claim 1, wherein the at least one processor is further configured to transmit a data packet including inter-processor channel information to the communication circuit to request a connection to the first communication network or the second communication network.

3. The electronic device of claim 2,
   wherein the at least one processor is further configured to designate a first inter-processor channel for the first communication network and a second inter-processor channel for the second communication network, and
   wherein the second inter-processor channel is different from the first inter-processor channel.

4. The electronic device of claim 3, wherein the first communication network and the second communication network are for data communication.

5. The electronic device of claim 1, further comprising:
   a plurality of subscriber identity module (SIM) cards,
   wherein a first SIM card among the plurality of SIM cards is configured to support communication through the first communication network, and
   wherein a second SIM card among the plurality of SIM cards is configured to support communication through the second communication network.

6. The electronic device of claim 5, wherein the plurality of SIM cards include at least one of a SIM card embedded in the electronic device or a software SIM card stored in one of the at least one processor of the electronic device or the memory of the electronic device.

7. The electronic device of claim 1, wherein the plurality of communication networks are distinguished per communication network service provider.

8. The electronic device of claim 1, wherein the at least one processor is further configured to:
   identify a communication network connectible to the electronic device among at least one communication network allocated to the application, and
   select the communication network connectible to the electronic device as the first communication network or the second communication network.

9. The electronic device of claim 1, wherein the at least one processor is further configured to:
   display information about the plurality of communication networks via the display, and
   allocate a communication network selected by a user input among the plurality of communication networks as the first communication network or the second communication network.

10. The electronic device of claim 1, wherein the communication circuit is further configured to, in response to receiving a request to connect to the second communication network while being connected to the first communication network according to the application, vary information about an antenna of the electronic device that is allocated to the first communication network.

11. The electronic device of claim 10, wherein the communication circuit is further configured to:
    delete the information about the antenna of the electronic device that is allocated to the first communication network,
    allocate a first antenna of the electronic device to the first communication network, and
    allocate a second antenna of the electronic device to the second communication network.

12. The electronic device of claim 1, wherein the communication circuit is further configured to:
    set a plurality of antennas of the electronic device according to multi-input multi-output (MIMO) technology to use any one of the plurality of communication networks, and
    separately group the plurality of antennas into at least two or more combinations according to dual subscriber identity module (SIM) dual active (DSDA) technology to use two or more of the plurality of communication networks.

13. A method for operating an electronic device, the method comprising:
    identifying a request for executing an application;
    in response to identifying the request for executing the application, identifying information about a communication network allocated to the application based on information about the application, the identified information about the communication network comprising communication network information necessary for executing the application; and based on identified information about the application, performing at least one operation of the application via one of a plurality of communication networks, wherein the performing of the at least one operation of the application comprises:

in response to a first communication network allocated to the application being identified based on the identified information, performing an operation of the application via the first communication network provided by a first communication network service provider among the plurality of communication networks, in response to a second communication network allocated to the application being identified based on the identified information, performing an operation of the application via the second communication network provided by a second communication network service provider among the plurality of communication networks, and in response to no communication network allocated to the application being identified based on the identified information about the application, performing an operation of the application via a communication network designated for the electronic device, and wherein, as part of the performing of the operation of the application via the second communication network by a communication circuit of the electronic device, allocating at least one of a plurality of antennas included in the electronic device to the first communication network and remaining antennas of the plurality of antennas to the second communication network in response to a request for a connection to the second communication network while the first communication network is connected.

14. The method of claim 13, wherein, as part of the performing of the operation of the application via the first communication network or the operation of the application via the second communication network by at least one processor of the electronic device, transmitting a data packet including inter-processor channel information for the first communication network or the second communication network to a communication circuit of the electronic device.

15. The method of claim 14, wherein the first communication network and the second communication network are for data communication, and wherein an inter-processor channel designated for the first communication network is different from an inter-processor channel designated for the second communication network.

16. The method of claim 13, wherein a communication through the first communication network is supported via a first subscriber identify module (SIM) card among a plurality of SIM cards included in the electronic device, and wherein a communication through the second communication network is supported via a second SIM card among the plurality of SIM cards.

17. The method of claim 13, wherein a communication through the first communication network is supported via a subscriber identify module (SIM) card embedded in the electronic device, and wherein a communication through the second communication network is supported via a software SIM card stored in one of a processor of the electronic device or a memory of the electronic device.

18. The method of claim 13, wherein the first communication network and the second communication network are distinguished based on communication network service providers.

19. The method of claim 13, further comprising, based on the plurality of communication networks being allocated to the application, designating a communication network connectible to the electronic device among the plurality of communication networks as the first communication network or the second communication network.

20. An electronic device, comprising:

a display;

a communication circuit configured to support communication through a plurality of communication networks;

at least one processor operatively connected with the display and the communication circuit; and a memory operatively connected with the at least one processor and configured to store information about a plurality of applications and information about the plurality of communication networks, wherein the memory is further configured to store instructions that, when executed cause the at least one processor to:

control the display to display a first icon of a first application and a second icon for the first application together with a plurality of icons of a plurality of applications, respectively, the first icon executing the first application via a first communication network provided by a first communication network service provider based on the first icon being selected, and the second icon executing the first application via a second communication network different from the first communication network and provided by a second communication network service provider based on the second icon being selected, in response to a selection of the first icon, execute the first application and control the communication circuit to transmit data by the first application via the first communication network provided by the first communication network service provider to an external electronic device, and in response to a selection of the second icon, execute the first application and control the communication circuit to transmit the data by the first application via the second communication network provided by the second communication network service provider to the external electronic device.

21. The electronic device of claim 20, wherein the instructions further cause the at least one processor to, in response to an identification of a credit for executing the first application via the second communication network, control the display to display the second icon.

22. The electronic device of claim 20, wherein the first icon comprises a first image and the second icon comprise a second image, and wherein the first image and the second image comprise a same image, the same image indicating that the first icon and the second icon comprise an icon for executing the first application in response to a selection thereof.

* * * * *